US008977633B2

(12) United States Patent  (10) Patent No.: US 8,977,633 B2
Christiansen et al. (45) Date of Patent: Mar. 10, 2015

(54) SYSTEM AND METHOD FOR GENERATING A POOL OF MATCHED CONTENT

(75) Inventors: Bradley John Christiansen, Robina (AU); Claes J M Loberg, Terranora (AU)

(73) Assignee: Guvera IP Pty Ltd. (AU)

( * ) Notice: Subject to any disclaimer, the term of this patent is extended or adjusted under 35 U.S.C. 154(b) by 407 days.

(21) Appl. No.: 12/969,583

(22) Filed: Dec. 15, 2010

(65) Prior Publication Data

US 2011/0145289 A1 Jun. 16, 2011

(30) Foreign Application Priority Data

Dec. 15, 2009 (AU) ................................ 2009906116

(51) Int. Cl.
G06F 7/00 (2006.01)
G06F 17/30 (2006.01)
G06Q 30/02 (2012.01)

(52) U.S. Cl.
CPC ............ *G06Q 30/02* (2013.01); *G06Q 30/0269* (2013.01)
USPC ........................................................ 707/750

(58) Field of Classification Search
None
See application file for complete search history.

(56) References Cited

U.S. PATENT DOCUMENTS

| 8,060,525 | B2* | 11/2011 | Svendsen et al. | 707/769 |
| 2003/0177066 | A1* | 9/2003 | Zhang et al. | 705/14 |
| 2005/0149397 | A1* | 7/2005 | Morgenstern et al. | 705/14 |
| 2007/0083406 | A1* | 4/2007 | Cummins | 705/7 |
| 2007/0260671 | A1* | 11/2007 | Harinstein et al. | 709/203 |
| 2008/0255926 | A1* | 10/2008 | Nakano et al. | 705/10 |
| 2009/0018922 | A1* | 1/2009 | Steelberg et al. | 705/14 |
| 2009/0089110 | A1* | 4/2009 | Lara et al. | 705/7 |
| 2009/0089141 | A1* | 4/2009 | Lara et al. | 705/10 |
| 2009/0112692 | A1* | 4/2009 | Steelberg et al. | 705/10 |
| 2009/0276459 | A1* | 11/2009 | Trout et al. | 707/104.1 |
| 2009/0326947 | A1* | 12/2009 | Arnold et al. | 704/257 |
| 2010/0306249 | A1* | 12/2010 | Hill et al. | 707/769 |
| 2012/0222064 | A1* | 8/2012 | Geer et al. | 725/32 |
| 2012/0240163 | A1* | 9/2012 | Des Jardins | 725/38 |

FOREIGN PATENT DOCUMENTS

WO WO 02057985 A2 * 7/2002
WO WO 2006071294 A2 * 7/2006

* cited by examiner

*Primary Examiner* — Taelor Kim
(74) *Attorney, Agent, or Firm* — Robert D. Becker; Manatt, Phelps & Phillips LLP

(57) ABSTRACT

A method of generating a pool of matched content pieces from an available pool of content pieces based on a selected sample, including providing at least one consumer database containing a plurality of consumer profiles with consumer preference identifying data stored on a data storage device, providing at least one brand database containing details of brand clients, each having one or more branding parameters stored on a data storage device, providing at least one content database containing a plurality of pieces of content provided by at least one content provider with each piece of content having one or more content profile identifiers stored on a data storage device, selecting a number of representative content pieces based on one or more branding parameters of a brand client to convey a brand identity, testing the representative content pieces against a set of constraints based on one or more content profile identifiers to establish that a minimum number of content piece identifiers are chosen using a data processor, and generating a pool of matched content pieces by selecting a plurality of content pieces from the available pool based on comparing the one or more content profile identifiers of the representative content pieces with one or more content profile identifiers of each content piece in the available pool of content pieces and including matches in the matched content pool using a data processor.

16 Claims, 1 Drawing Sheet

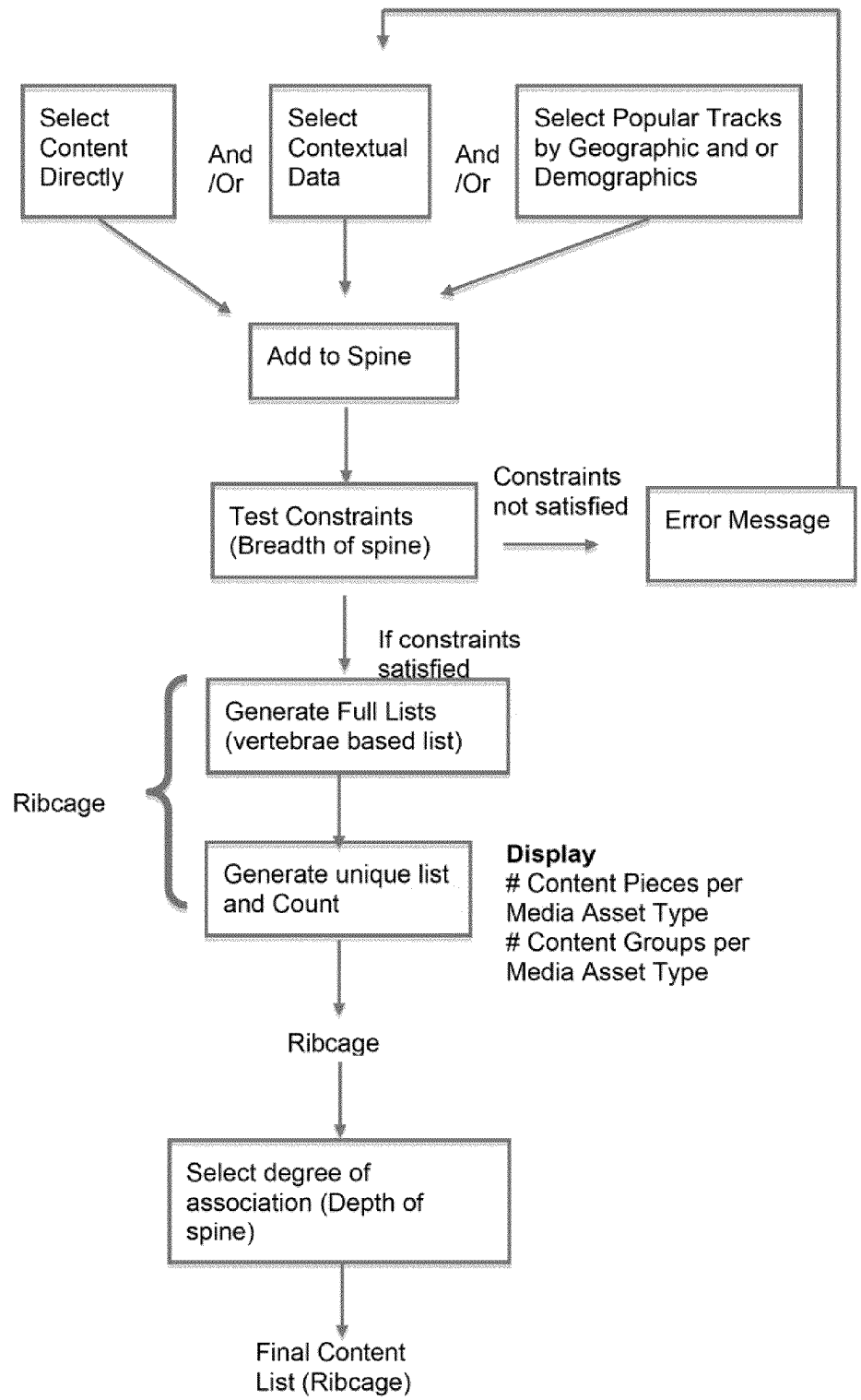

SYSTEM AND METHOD FOR GENERATING A POOL OF MATCHED CONTENT

CROSS-REFERENCE TO RELATED APPLICATIONS

The present application claims priority from Australian Patent Application No. 2009906115 filed Dec. 15, 2009, which is incorporated herein by reference in its entirety for all purposes.

FIELD

The present invention relates to computer implemented systems and method for generating a body of matched content from a larger pool of content based on parameters set by a particular brand client.

BACKGROUND ART

Under Australian Patent No. 2009200295, a brand channel has to generate content that meets the following:
Contextual information relevant to Brand exposure requirements
Contextual information relevant to Consumer inputs
Contextual information relevant to Content inputs.
A brand client will want to select content that:
Fits its brand personality
Is sought by the target consumers
Allowed for the brand to be associated with.
A brand channel must have enough content so that the content is not perceived as exclusive or sponsored, or that a particular artist always appears on a brand channel.

It will be clearly understood that, if a prior art publication is referred to herein, this reference does not constitute an admission that the publication forms part of the common general knowledge in the art in Australia or in any other country.

SUMMARY

Embodiments of the present invention are directed to systems and methods for selecting a pool of matched content, which may provide the consumer with a useful or commercial choice.

With the foregoing in view, an embodiment of the present invention resides broadly in a computer implemented method of generating a pool of matched content pieces from an available pool of content pieces based on a selected sample, the method including the steps of:
providing at least one consumer database containing a plurality of consumer profiles with consumer preference identifying data stored on a data storage device,
providing at least one brand database containing details of brand clients, each having one or more branding parameters stored on a data storage device,
providing at least one content database containing a plurality of pieces of content provided by at least one content provider with each piece of content having one or more content profile identifiers stored on a data storage device,
selecting a number of representative content pieces based on one or more branding parameters of a brand client to convey a brand identity,
testing the representative content pieces against a set of constraints based on one or more content profile identifiers to establish that a minimum number of content piece identifiers are chosen using a data processor, and
generating a pool of matched content pieces by selecting a plurality of content pieces from the available pool based on comparing the one or more content profile identifiers of the representative content pieces with one or more content profile identifiers of each content piece in the available pool of content pieces and including matches in the matched content pool using a data processor.

In another embodiment of the present invention a computer implemented content matching system for generating a pool of matched content pieces from an available pool of content pieces based on a selected sample, the system including:
at least one consumer database containing a plurality of consumer profiles with consumer preference identifying data stored on a data storage device,
at least one brand database containing details of brand clients, each having one or more branding parameters stored on a data storage device,
at least one content database containing a plurality of pieces of content provided by at least one content provider with each piece of content having one or more content profile identifiers stored on a data storage device,
a content matching engine operating in association with a data processor which compares the one or more content profile identifiers of a number of representative content pieces chosen by a brand client to convey a brand identity based on one or more branding parameters of the brand client with one or more content profile identifiers of each content piece in the available pool of content pieces, tests the representative content pieces against a set of constraints based on one or more content profile identifiers to establish that a minimum number of content piece identifiers are chosen, and generates a pool of matched content pieces by selecting a plurality of content pieces from the available pool based on the comparison and includes matches in the matched content pool.

The "Spine and Rib" concept is one solution to the problem of selecting content for a brand channel while making the selection broad enough to cover a wide range of content, dynamic enough to enable targeting of consumers that fit the brand channel audience on an ongoing basis and to have the depth of content that reflects the brand's personality.

A Spine is a small selection of content that represents the core or quintessential content for the brand channel.

A Ribcage defines the brand's association to a particular media context. It is a list of matched content that a brand will pay for the consumer to download and specifies the degree of relatedness of the brand and content with each piece of content constituting a "Rib".

The depth of association can be chosen by the brand. The ribcage generated from the spine has a degree of association based on the spine and the tagging associated with each content piece chosen. The depth can be varied by the brand choosing whether it wants to choose a percentage (%) or degree of variation from the spine selection, eg 0%, 10%, 20% etc. The list in the ribcage is then broadened or shrunk (still based on the spine) depending on the depth of association chosen. This depth preferably defines what content the brand channel will pay for.

It also preferably defines how closely a piece of content should match the spine content before appearing in the list of matched content. A brand client can therefore adjust the depth of content to reach more consumers (by reducing the depth required) with a corresponding weakening of the message conveyed or provide a stronger message to fewer consumers by increasing the depth of content required.

In one embodiment, the system is an advertising system. The system is preferably computer implemented. As such, the system will normally be implemented on at least one computer including one or more processors, storage means and associated with one or more communications pathways.

The system of an embodiment of the present invention may be implemented using devices with computer processors such as telephones, portable or desktop computers, personal data storage devices, MP3 and MP4 players, audiovisual storage and display devices, televisions and the like. Provided that a device that can access communications pathways for the downloading of content, that device may be used according to the system of the present invention.

Typically, the content matching engine of an embodiment of the present invention will be located on a network of computers such as the Internet. Indeed, the system will preferably be accessed through a network of computers such as the Internet or a worldwide network.

Typically, the content matching engine of the embodiment will be accessed through an interface provided as a webpage located on a worldwide network of computers. In this way, the system can provide targeted advertising at a personal level to a large number of users simultaneously.

The system is adapted to provide tailored advertising through the provision of content which is preferred by consumers being linked with advertising from brands being associated with that content.

Preferably, the interface will contain passive identification of the brand only. It is preferred that any advertising is not embedded or interspersed with any piece of content. Further, the advertising will not require display before, during or after the content.

Preferably, the system will be implemented across any network and will typically be network independent, with no network prevented from access to the system but no network preferred either.

The system will normally have a system administrator. The system administrator will typically have access to all parts of the system and may have access through the same interface as the other members of the system was through a stand alone, or separate specialised interface. Normally, the system administrator will have accessed through the same interface with the level of access of the system administrator differentiated by access on login information which will distinguish the system administrator from other users or members.

The system will therefore have members of at least the following general classes, as well as the system administrator:
1. consumers;
2. brand clients;
3. content providers.

The system has at least one consumer database containing a plurality of customer profiles with preference data. The at least one consumer database will typically be created and maintained by a system administrator, with the data in the database(s) updated and maintained mainly by the consumers themselves, once the consumers are members of the system.

Membership to the system for consumers will typically be free in response to the consumer providing information or creating a consumer profile. Typically, this will (once checked by the system administrator, typically by an automated system of the system administrator) allow the consumer access to the system. There may be different levels of consumer membership based on the amount of information provided by a consumer with a consumer who provides more, or more detailed information being provided with more privileges than a consumer that provides less information.

Each consumer will typically have a consumer profile containing information of two basic types namely, generic identifying information such as name, address, contact details and also habit or preference data such as age, likes and dislikes, music choices, brand preferences and the like.

Typically, the preference data may be captured or provided by a consumer directly, that is, in answer to direct questions as to their preferences. Alternatively, the preference data may be captured or provided through surveys, testing or quizzes, for example in order to build a consumer preference profile for each consumer.

The consumer profile will typically therefore have a set of information which is more or less fixed, namely the generic identifying information (although it is anticipated that this set of information will change such as for example, if a consumer moves or changes addresses) and a set of variable information namely that their consumer preference information as the set of information is likely to change over time.

As mentioned above, membership to the system for the consumers will typically be through the system administrator although this process may be automated and systems provided to approve membership of consumers based on the information provided. There may additionally be an automated system which marks a consumer profile as "inactive" if the profile has not been updated or used for a particular period of time. This will preferably increase the motivation of consumers to maintain an active profile and also assist with ensuring that the consumer's preference profile is up to date.

Also as mentioned above, consumer membership is voluntary and consumers may join at any time. Consumers may have a single profile or multiple profiles. Consumer membership applications may be subject to screening by the system administrator. The most important part of the consumer membership is the provision of preference data and this may be a precondition for consumer membership.

The consumers may have access to their consumer profile through a consumer interface and access to the at least one consumer database will typically be according to login or access information which will give a consumer access to their own profile. Normally, the consumers will access the generic interface and access will be granted based on their login or identifying information with use of the system limited according to that information.

Consumers may typically amend their consumer data at any time which will normally upload to the at least one consumer database. Each consumer will typically be identified by their preference data with the only access to the consumer profiles by a third party being through the system administrator.

The system has at least one brand database containing details of brand clients, each having one or more branding parameters. The brand clients may be members of the system through a third-party media or advertising agency or directly.

Membership to the system by the brand clients will normally occur along a similar basis to the consumer members but the brand clients will typically be provided with different abilities. Normally, the abilities or rights of the brand clients within the system will be determined by the brand client login or identifying information used, once the brand client becomes a member of the system.

Typically, brand clients will join the system in order to advertise by building a relationship with the consumer through an association with particular content which will also typically convey to the consumer, a particular positioning strategy of the brand client.

The brand clients may not be direct (that is active uploading) members of the system but may be pseudo-members of the system. For example, a brand client may have signed a representation agreement with a media or creative agency which will advise on a particular brand strategy. The brand client will still be a member of the system to the extent that the at least one brand database will contain information and identifying particulars of the brand client, but the interaction with the system on behalf of the brand client may be undertaken by the media or creative agency representing the brand client. In this case, the brand client will typically be a member of the system as the paying customer even though the media/creative agency may design and implement the marketing or branding strategy by managing the branding parameters within the system.

The brand clients (or a representative) will typically define their own brand personality and/or particular positioning strategy using the branding parameters. The personality or positioning strategy may be in relation to the brand as a whole or particular products or lines within a house brand.

The brand clients (or a representative) will also typically define their target demographic or geographic area.

The at least one brand database will preferably contain identifiers of the brand client for example company name and contact information and also the branding parameters which will preferably define the message which the brand wishes to convey to their targeted demographic. These branding parameters may be positively recited, such as "prefers name brand" or negatively recited, such as "non-smoking".

The system has at least one content database containing pieces of content with each piece of content having one or more content profile identifiers.

The pieces of content (which may be simply referred to as "content") may have any form including music, audio, video, books, still images, snippets, or portions of the above. Basically, the content can have any form provided that the content is electronic or digital in order that the content can be transmissible between the system and the at least one consumer and between the at least one content provider and the system. Normally, each piece of content will be stored in an electronic file and it is this electronic file which will typically be capable of transmission, dissemination or copying or the like onto a physical medium.

The content will typically be provided from any source. For example, an entertainment studio, TV network, Internet social networking systems or record labels may choose to provide content to the system. Alternatively, smaller organisations or individuals may choose to provide content directly to the system such as home movies, demo music tracks or the like.

The content may be provided directly to the system or indirectly. Normally, the content provider will have to be or have a legal relationship with the content owner and systems will normally be provided to monitor the content in this regard to minimise the risk that content can be provided without the permission of the owner.

Each piece of content will also have one or more content profile identifiers which will typically be referred to as "tags". Each piece of content will also typically have identification or ownership information. Preferably, the ownership information identifies who owns the content in order to recompense the owner and the tags will identify the type of content.

Each piece of content will typically be tagged according to its "type". Each piece of content will preferably be tagged according to its Genre, Mood, Style and Theme. For example, the Genre tags will normally be those used in a particular industry such as music genre including pop, classical, rock, rhythm and blues, house/techno, folk and the like. Each of these broad genre categories may include at one or more sub-genre. There are also typically genre associated with video games, television, film, literature and the like. Therefore, each piece of content will typically be tagged according to its broad type and then further tagged according to genre. Normally, the genre tagging will also fit with the accepted genres in industry.

Mood tagging will preferably represent the relatively long-lasting, effective or emotional state that the content offers for example fun, cheerful, humorous, gentle, scary, thought provoking, reflective and the like.

Style tagging will preferably identify the pieces of content for composition or format. Genres have been used to identify "style", but the system of the present invention will typically tag the content with more complexity. For example, a song may be a rock genre song but maybe further classified using style tagging as modern rock or contemporary rock and may indicate the basic style of the entertainment content.

Theme tagging will typically identify the broad idea, message or lesson conveyed in the piece of content. For example the piece of content may be comforting, relaxing, suggestive or the like.

Importantly, tagging systems have been used conventionally but the tagging systems vary depending upon the provider of the content and the various entertainment types. The system of the present invention will typically provide a standard for content tagging.

Content tagging may also be adjusted or performed through the monitoring of Internet searches or the like for example, through reviews, comments, links and categorisation. The present system therefore accounts for the fact that consumers will typically search the Internet for particular content and may use these searches and/or results to improve the accuracy of the content tagging. In this manner, the content tagging may be reactive. Typically, any content tagging will occur in real time as will adjustments to content tagging, as the popularity of particular content and/or preferences of a consumer will typically vary over time.

The content tag updates may be periodic or preferably ongoing in real time.

Preferably, each piece of content will be initially tagged upon uploading or the first provision of that piece of content to the system. There will typically be an analysis process upon uploading in order to check to see whether a particular piece of content which has been submitted is not already present on the system.

The tags for the piece of content may be changed or vary over time in response to feedback from consumers who have been provided with that piece of content. There may therefore be a feedback mechanism in place to question or follow-up with consumers who have been provided with a piece of content to request whether the piece of content was tagged in the correct way and/or that the tag is up-to-date. The tag updating process may be an automated process.

Each piece of content may have more than one tag but preferably, the number of tags will typically be limited to no more than between 5 to 10 tags. Tags may also be provided in different levels of importance with the number of tags in each level varying with the level of importance. For example, there may only be 5-10 top-level importance tags attached to a piece of content but that same piece of content may have 10-1000 less relevant or important tags.

The step of selecting a number of representative content pieces based on one or more branding parameters of a brand client to convey a brand identity may be conducted by a consumer or more preferably, by the brand client.

Typically, each of the representative content pieces chosen are added to the spine. Typically, a predetermined number of content pieces must be chosen in order to define the spine. The content matching engine will then typically use the representative content pieces to search for content in the at least one content database which matches the content in the spine. It can be taken into account by adjusting how closely the content piece must match before the particular content piece is included in the rib cage.

The content matching engine may search every piece of content in the content database or alternatively, only search content of a particular type or only search certain numbers of content of a particular type as examples.

The representative content may be chosen by direct selection of content at the brand client wishes to be associated with. Alternatively, the representative content may be chosen by contextual data. For example, the content may be chosen according to contextual data related to the brand, content, genre, theme, country, city, age group or gender as examples. The content may be chosen according to consumer contextual data which relates to their target demographic consumer such as country, city, postcode, page, favourite pastimes, or the like. Still further, the content may be chosen at according to content contextual data such as by label, publisher, artist, mood, or through one or more restrictions such as a brand-name restriction, age restrictions, or brand type restrictions.

Alternatively or in addition thereto, the content may be chosen according to geographical and/or demographic popularity. According to the selection criteria, the brand client may review the popularity of content by geographical demographic segment and select content accordingly.

Methods of embodiment of the present invention include the step of testing the representative content pieces against a set of constraints based on one or more content profile identifiers to establish that a minimum number of content piece identifiers are chosen using a data processor. The representative content selected must include a wide enough selection so as to avoid over association of particular content with particular brand clients. Over association maybe where the artist or content piece is always being associated with only a single brand client. Over association may be possible subject to an agreement between the content provider in the brand but will not typically be preferred.

The degree of association may be calculated as a quantitative value. Each content preferably has content profile identifiers. The content profile identifiers may be used as a base to calculate a degree of association. According to one preferred embodiment, each content profile identifier may be given a weighting factor or ranking. A numerical or other quantitative value can then given to each piece of content in each content profile identifier which together with the weighting factor or ranking of the each content profile identifier can be used to calculate a value or set of values related to the each content profile identifiers for each piece of content.

This value or set of values can then be used to calculate a degree of association of the spine content pieces with the potential rib content pieces by using the variation of the spine content compared to the rib content. For example, once the spine content has been designated, the value or set of values for each piece of content in the spine (or a collated or average value or values) can be used to compare to each potential piece of content as to whether the potential piece of content is included in the ribcage or not depending on the variation between the value of set of values of the potential piece of content and the value or values of the spine.

Of course, any selection of content may be manual but is preferably automatic according to the method of the invention. Manual selections may be made in addition to the automatic selections.

The content profile identifiers may be or include non-numerical tags or contextual data. The brand client may also set a threshold degree of matching required in order for a content piece to be included as a match.

The degree of association calculation may therefore be based on a comparison base of:
 the presence or absence of one or more content profile identifiers (whether numerical or non-numerical);
 the relative importance of one or more content profile identifiers in relation to one or more other content profile identifiers; and/or
 a value or set of values related to the content profile identifiers for each piece of content,
with the same comparison base present in the representative content pieces.

There are typically two tests of constraints namely a first test to ensure that there are enough content pieces in spine in order to provide sufficient data upon which to build the rib cage and secondly, to ensure that there is not too much data in the spine that would reduce the size of the rib cage below an acceptable minimum number by requiring a match to a large number of parameters before being included in the rib cage.

The constraints will typically include minimums. For example, a minimum type of content or media asset may be required such as a minimum number of music, film, game, books or the like. Similarly, a minimum number of performers or artists may be provided that such ads in minimum of four artists may need to be provided if music is chosen. Further, there may be a minimum number of publishers or producers required, or in minimum number of content pieces in each media asset type such as a minimum number of music content pieces or a minimum number of film content pieces.

The constraints are preferably aimed at ensuring that the system has enough data in the tags of the representative content pieces to be able to build a spine.

As discussed above, the constraints may also provide a test to ensure that the sample is not over specified in that a large enough pool of content pieces will exist which matched the required spine in order to provide a rib cage. If over specified, there may not be enough content pieces to include in the match to content pool to prevent over association.

Further, a brand constraint may be applied to remove content that brand cannot be associated with. This may occur according to brand restrictions or content restrictions.

A method of an embodiments of the present invention also include the step of generating a pool of matched content pieces by selecting a plurality of content pieces from the available pool based on comparing the one or more content profile identifiers of the representative content pieces with one or more content profile identifiers of each content piece in the available pool of content pieces and including matches in the matched content pool using a data processor.

As mentioned, the matching may be on the basis of numerical values or non-numerical tags. The content profile identifiers may include quantitative, numerical or non-numerical tags.

Each representative content piece chosen in the sample has one or more content tags. The content tags are the basis upon which each representative content piece is compared to the content database for matches. A list of matching content is produced, typically on one of two bases.

The first basis may be one in which the tags of the representative content pieces are combined first to produce a sample tag list and then each content piece in the content database is compared with the compiled sample tag list. Alternatively, the tags of each representative content piece is compared to the tags of each of the general content pieces in the content database. Therefore, according to this basis, if there are 20 representative content pieces in the sample, then 20 matching lists will be generated initially. The individual matching lists are being preferably compared to one another for duplicates. Where duplicates are identified, account is maintained as the high account, the higher the strength of the association of that content piece with the representative content pieces.

The multiple lists are being combined to form a single unique list which contains ranked content matches. The unique list may be itemised and a count kept for each type of media asset. The unique list is typically known as the rib cage for a brand client. The rib cage may be dynamically updated. The rib cage may be displayed or viewable by brand client.

The brand client may redefine the spine at any time. This redefinition may be manual or automatic and may trigger the regeneration of the matched content pool.

A single brand client they define different spines or different campaigns or demographic. For example, a brand owner may have a spine with an associated rib cage for a family demographic a second spine with different associated rib cage for teenagers in the third spine with associated rib cage for sporting people regardless of their age.

The method and system of the preferred embodiment will typically provide a transactional model allowing content to be accessed/downloaded by a consumer provided that the content matches the consumer's search preferences, and that the consumer fits within the brand client's preference parameters. The method and system will therefore check the consumer profile prior to releasing the content for download and compare the consumer profile with the branding parameters entered by the brand client. The method and system also tracks the content downloaded, and enables payment to content owners once download has been authorised.

There will therefore be a request by consumer in the form of a search, authorisation of the download of the content provided that the consumer's profile matches the branding parameters of the brand client, and once the download is complete (or upon authorisation of the download) the method and system will also authorise the payment of remuneration to the content owner, through a third party if required.

Authentication of identity systems may be used in conjunction with the system of the present invention. There are many of these systems available and any may be used to authenticate the identity of members of any of the groups associated with the system. The authentication system will typically be integrated with the transaction system and the consumer request, uploading of content and provision of content subsystems.

For the purposes of the present invention, the term "disruptive" is defined as any method of delivery which a customer doesn't choose to receive or that is undesirable to the customer. However this language is not intended to be a limitation on the term disruptive but is merely explanatory in nature to assist the reader.

A brand client may be a single entity or may include groups of one or more entities grouped according to shared quality or target audience. The "brand" of such a brand client is communicated to the user when they engage in any brand selection activity. For example, a brand client may be a collective of individual entities such as a group of real estate agents for example who all have a shared target. The brand parameters of such a brand client may therefore be settled on as a group of members of the brand client.

The pieces of content should be considered to be anything of intrinsic or implied value that a user can "consume" specifically including but not limited to, music, audio, video, books or ebooks, games, applications (or "apps"), software "add-ons", still images, snippets, services, redeemable vouchers, branded material, t-shirts, caps, tickets to events, information services or portions of the aforementioned.

For the purposes of the present description, the term "consume" includes downloading the content whether for immediate or delayed consumption, printing, or saving the content. However this language is not intended to be a limitation on the term consume but is merely explanatory in nature to assist the reader.

Content provision shall include but not be limited to one time purchases, rentals, term subscriptions, use subscriptions, and rights limited ownership (e.g. DRM limited music and video).

Any lists may be displayed either as a search is conducted or at the conclusion of the search or part of the search.

The term "display" shall be used to indicate supply and or distribution of content to a consumer, and implicitly includes the default common mechanisms for supply and or distribution appropriate for the nature of the content. In this many display may be taken to mean view, download, stream, receive by email or tradition mail or courier services, as well as other germane mechanisms. However this language is not intended to be a limitation on the term display but is merely explanatory in nature to assist the reader.

The embodiments of the present invention are distinguishable from the vast majority of other delivery systems for a variety or reasons, including but not limited to:
1. the manner in which the content and the matched advertising is selected by the system;
2. the delivery of the content with the advertising in a non-disruptive manner; and
3. that the customer chooses the advertising to be viewed when they choose the brand client associated with the content.

The embodiments of the present invention are particularly adapted for delivery of content to a user according to the request of a user over an electronic or digital network. As such, it is particularly adapted for use in the field of television (subscriber or "pay" television, or free to air), internet delivery, or even in flight entertainment (IFE) delivered to individual seats on a flight dependent upon the customer in that seat. According to the IFE embodiment, the customer will need to provide the system with customer parameters or login details to access customer parameters present in the system already in order for the system to recognize the customer. In this embodiment, the communications pathway is one between the customer's seat display or delivery mechanism and a database of the content and content is therefore "downloaded" from the database (normally a central database servicing the entire flight) to the customer's seat display or delivery mechanism. The present invention therefore may utilize an "open" communications network or a "closed" communications network. Any of the features described herein can be combined in any combination with any one or more of the other features described herein within the scope of the invention.

BRIEF DESCRIPTION OF THE DRAWINGS

Various embodiments of the invention will be described with reference to the following drawing, in which:

FIG. 1 is a schematic representation of a preferred algorithm for generating a pool of matched content pieces from an available pool of content pieces based on a selected sample according to a preferred embodiment.

DETAILED DESCRIPTION OF THE PREFERRED EMBODIMENT

According to a preferred embodiment of the present invention, a system and method for selecting a pool of matched content from a larger pool is provided.

A schematic illustration of the preferred methodology is illustrated in FIG. 1.

Select Content Spine

A brand can choose content for their spine in a number of ways with three main ways.

1. Direct selection of content that the brand wants to be associated with.
2. Selection by contextual data. Contextual data or "tags" exist for Brand exposure requirements, the Consumer, and Content.
   a. An example of Brand contextual data is Brand Industry (eg Food, Alcohol, Mining, etc), Content Types (eg Film, Music, Books), Content Genre (eg for Music Rock, Jazz, for Film Action, Documentary), Theme (eg Beach, night time, Romantic), Country, City, Age Group, Sex.
   b. An example of consumer contextual data is Country, City, postcode, Date of Birth, favorite holidays, favorite sports, favorite music, favorite things and gadgets, favorite countries, favorite books, favorite films, favorite food, favorite web activities, favorite charities.
   c. An example of content contextual data is Label, Publisher, Artist, Genre, Theme, Mood, Brand Name Restrictions (eg no Target), Age restrictions (eg no less than 18), Brand Type Restrictions (No alcohol, No tobacco, No drugs).
3. Selection by Geographic and Demographic popularity. This allows a brand to view current popularity of content by Geographic or demographic segment and to select tracks. Track selection could be by individual track or the top 10 for that geographic or demographic segment. This can be historical or live data from one or more database.

Test Constraints (Breadth of Selection)

Constraints apply to the selection of a spine and the rib cage that is generated. A brand cannot pick one piece of content (spine) and generate a list (ribcage) from that one piece. A spine and also the ribcage must contain a wide enough selection so as to avoid a specific association with one artist or album or film or a specific content piece. This is regarded as a sponsorship and comes at a greater price than an individual transaction.

Spine Constraints are:

1. Minimum number of Media Assets. A media asset is Music, Film, Games, Books etc. A minimum number could be one, ie just one asset type could be selected, eg games or music.
2. Minimum number of Artists, Composers, Authors, Producers or whatever the appropriate term for the authoring of the content and who general holds the copyright. For example, for music the minimum number of music artists may be 4, for films the minimum number may be 2, for books it may be 3. These are illustrative examples only and the numbers specified may change.
3. Minimum number of Publishers, Albums, Groups or whatever the appropriate term for the publishing or production of the content piece. Eg for music the minimum number of publishers is 2, and albums is 2, for games the minimum number of publishers is 2.
4. Minimum number of content pieces in each media asset type. Eg minimum of 20 tracks for music.
5. Apply Restrictions. Remove content that the brand cannot be associated with due to content restrictions. This could be a brand name restriction (eg specifically Reebok®) or a brand type restriction (eg alcohol brands). For example, a brand may not want to be associated with violent or dangerous content. Alternatively, the restrictions may be content restrictions applied by the content provider, that is, the content provider may not want their content associated with cigarettes or alcohol brands.

Generate Content Ribcage

A ribcage is generated from the spine selected. This is generated as follows:

1. Each content piece selected (each vertebrae) has been tagged (the content contextual data identified above). Each content piece is matched against the whole database for the exact matches to that content piece.
2. This will generate a number of lists of content pieces. For example if there are 20 content selections in the spine then there will be 20 lists. There may or may not be overlaps amongst this list. From the 20 lists, a unique list is generated, and for any duplicates or multiple values a count is recorded. This generates a strength of association of the content with the brand channel personality chosen by ranking the unique content list.
3. The ribcage generated is displayed either alphabetically (by title, group etc) or by strength of association. The number of content pieces by media asset type associated with the ribcage is also displayed, eg 10,000 music tracks, 200 film titles.

Select Depth of Content

The depth of association can be chosen by the brand. The ribcage generated from the spine has a degree of association based on the spine and the tagging associated with each content piece chosen. The depth can be varied by the brand choosing whether it wants to choose a percentage (%) or degree of variation from the spine selection, eg 0%, 10%, 20% etc. The list in the ribcage is then broadened or shrunk (still based on the spine) depending on the depth of association chosen. This depth defines what content the brand channel will pay for.

In the present specification and claims (if any), the word "comprising" and its derivatives including "comprises" and "comprise" include each of the stated integers but does not exclude the inclusion of one or more further integers.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more combinations.

The invention claimed is:

1. A computer implemented method of generating a pool of matched electronic content pieces from an available pool of electronic content pieces based on a selected sample, the method including the steps of:

providing at least one consumer database containing a plurality of consumer profiles with consumer preference identifying data stored on a data storage device, providing at least one brand database containing details of brand clients, each having one or more branding parameters stored on a data storage device, providing at least one content database containing a plurality of pieces of electronic content provided by at least one content provider with each piece of electronic content having one or more content profile identifiers stored on a data storage device, selecting, by a brand client, a plurality of representative electronic content pieces based on one or more branding parameters of the brand client to convey a brand identity, testing the selected plurality of representative electronic content pieces by an administrator using a data processor against a set of constraints to establish that a first constraint is satisfied, the first constraint comprising any one or more of:

determining an asset type for each of the representative electronic content pieces of the selected plurality, and determining that the asset types for the selected plurality includes a minimum number of asset types;

determining an asset type for each of the representative electronic content pieces of the selected plurality, and determining that the selected plurality includes a minimum number of any one or more of performers, artists, publishers, producers, or albums for each asset type of the selected plurality; or determining that a particular asset type is included in the selected plurality, and determining that the selected plurality includes a minimum number of representative electronic content pieces having the particular asset type; and generating a pool of matched electronic content pieces by:

selecting a plurality of electronic content pieces from the available pool based on comparing the one or more content profile identifiers of the representative electronic content pieces with one or more content profile identifiers of each content piece in the available pool of electronic content pieces to identify a set of matches, and including the set of matches in the matched electronic content pool only if a second constraint is satisfied, the second constraint comprising determining that the set of matches of electronic content pieces include a minimum number of pieces of content for each type of content, wherein each content profile identifier of each piece of electronic content is given a weighting factor or ranking and a quantitative value is given to each piece of electronic content in relation to each content profile identifier, wherein the quantitative value together with the weighting factor or ranking of each content profile identifier is used to calculate a value, or set of values related to each content profile identifier, for each piece of electronic content;

wherein the value, or set of values, is used to calculate a degree of association of the representative electronic content pieces with electronic content pieces by using the variation of the representative electronic content pieces compared to the electronic content pieces and including an electronic content piece in the matched content pool based on the degree of association;

wherein a minimum number of electronic content pieces must be chosen in order to define the representative electronic content pieces prior to testing the representative electronic content pieces against the set of constraints.

2. A computer implemented method as claimed in claim 1, wherein the quantitative value is a numerical value.

3. A computer implemented method as claimed in claim 1, wherein the quantitative value is or includes non-numerical contextual data.

4. A computer implemented method as claimed in claim 1, wherein a depth of association is chosen by a brand client.

5. A computer implemented method as claimed in claim 4, wherein the contents of the matched electronic content pool is varied by the brand client choosing a degree of association that must be satisfied before including an electronic content piece in the matched electronic content pool.

6. A computer implemented method as claimed in claim 1, wherein the content profile identifiers include one or more of Genre, Mood, Style and Theme.

7. A computer implemented method as claimed in claim 1, wherein the content profile identifiers are reactive in real-time.

8. A computer implemented method as claimed in claim 1, wherein the step of selecting a number of representative electronic content pieces based on one or more branding parameters of a brand client to convey a brand identity is conducted by the brand client.

9. A computer implemented method as claimed in claim 1, wherein a content matching engine searches every piece of electronic content in the content database.

10. A computer implemented method as claimed in claim 1, wherein a content matching engine searches electronic content pieces based on chosen parameters related to the content profile identifiers.

11. A computer implemented method as claimed in claim 1, wherein the representative electronic content pieces are chosen by direct selection of electronic content pieces that the brand client wishes to be associated with.

12. A computer implemented method as claimed in claim 11, wherein the representative electronic content pieces are chosen according to contextual data relating to a potential target consumer, one or more content profile identifiers or one or more restrictions.

13. A computer implemented method as claimed in claim 1, wherein the step of testing the representative electronic content pieces against the set of constraints includes a test to ensure that there is a sufficient number of electronic content pieces in the representative electronic content pieces in order to provide sufficient data upon which to build the electronic matched content pool.

14. A computer implemented method as claimed in claim 13, wherein the constraints include one or more minimum numbers of one or more content profile identifiers.

15. A computer implemented method as claimed in claim 13, wherein a brand constraint is applied to remove electronic content that a brand cannot be associated with from the matched content pool.

16. A computer implemented content matching system for generating a pool of matched content pieces from an available pool of content pieces based on a selected sample, the system including:

at least one computer having one or more computer processors communicatively coupled to at least one or more computer-readable data storage devices at least one consumer database containing a plurality of consumer profiles with consumer preference identifying data, the at least one consumer database stored on a computer-readable data storage device, at least one brand database containing details of brand clients, each having one or more branding parameters stored on a computer-readable data storage device, at least one content database containing a plurality of pieces of electronic content provided by at least one content provider with each piece of electronic content having one or more content profile identifiers stored on a computer-readable data storage device, selecting, by a brand client, a plurality of representative electronic content pieces based on one or more branding parameters of the brand client to convey a brand identity, testing the selected plurality of representative electronic content pieces by an administrator using a data processor against a set of constraints to establish that a first constraint is satisfied, the first constraint comprising any one or more of:

determining an asset type for each of the representative electronic content pieces of the selected plurality, and determining that the asset types for the selected plurality includes a minimum number of asset types;

determining an asset type for each of the representative electronic content pieces of the selected plurality, and determining that the selected plurality includes a minimum number of any one or more of performers, artists, publishers, producers, or albums for each asset type of the selected plurality; or determining that a particular asset type is included in the selected plurality, and determining that the selected plurality includes a minimum number of representative electronic content pieces having the particular asset type; and generating a pool of matched electronic content pieces by:

selecting a plurality of electronic content pieces from the available pool based on comparing the one or more content profile identifiers of the representative electronic content pieces with one or more content profile identifiers of each content piece in the available pool of electronic content pieces to identify a set of matches, and including the set of matches in the matched electronic content pool only if a second constraint is satisfied, the second constraint comprising determining that the set of matches of electronic content pieces include a minimum number of pieces of content for each type of content, wherein each content profile identifier of each piece of electronic content is given a weighting factor or ranking and a quantitative value is given to each piece of electronic content in relation to each content profile identifier, wherein the quantitative value together with the weighting factor or ranking of each content profile identifier is used to calculate a value, or set of values related to each content profile identifier, for each piece of electronic content;

wherein the value, or set of values, is used to calculate a degree of association of the representative electronic content pieces with electronic content pieces by using the variation of the representative electronic content pieces compared to the electronic content pieces and including an electronic content piece in the matched content pool based on the degree of association;

wherein a minimum number of electronic content pieces must be chosen in order to define the representative electronic content pieces prior to testing the representative electronic content pieces against the set of constraints.

* * * * *

UNITED STATES PATENT AND TRADEMARK OFFICE
CERTIFICATE OF CORRECTION

PATENT NO. : 8,977,633 B2  Page 1 of 1
APPLICATION NO. : 12/969583
DATED : March 10, 2015
INVENTOR(S) : Bradley John Christiansen et al.

It is certified that error appears in the above-identified patent and that said Letters Patent is hereby corrected as shown below:

On the Title Page

Item (30) Foreign Application Priority Data
Change "200990611 to 2009906115"

Signed and Sealed this
Fifteenth Day of September, 2015

Michelle K. Lee
*Director of the United States Patent and Trademark Office*